United States Patent [19]
Cannon et al.

[11] Patent Number: 5,363,090
[45] Date of Patent: Nov. 8, 1994

[54] METHOD AND APPARATUS FOR COMBINING SUBMESSAGES OF A MESSAGE TO FORM THE COMPLETE MESSAGE

[75] Inventors: Gregory L. Cannon, Coconut Creek; Gregory W. Fuller, Boca Raton; William J. Macko, West Palm Beach; Robert D. Fennell, Coral Springs, all of Fla.

[73] Assignee: Motorola, Inc., Schaumburg, Ill.

[21] Appl. No.: 917,878

[22] Filed: Jul. 23, 1992

[51] Int. Cl.[5] .......................... H04Q 1/00; G08B 5/22
[52] U.S. Cl. ................................ 340/825.44
[58] Field of Search ...................... 340/825.44, 825.52; 455/38.1

[56] References Cited

U.S. PATENT DOCUMENTS

| | | | |
|---|---|---|---|
| 4,383,257 | 5/1983 | Giallanza | 340/825.44 |
| 5,089,813 | 2/1992 | DeLuca | 340/825.44 |
| 5,233,354 | 8/1993 | Ide | 340/825.44 |

FOREIGN PATENT DOCUMENTS

| | | | |
|---|---|---|---|
| 9103037 | 3/1991 | WIPO | 340/825.44 |
| 9109504 | 6/1991 | WIPO | 340/825.44 |

Primary Examiner—Donald J. Yusko
Assistant Examiner—Brian Zimmerman
Attorney, Agent, or Firm—Kelly A. Gardner

[57] ABSTRACT

A method in a radio communication device (110) for receiving a lengthy message comprises the steps of receiving an RF signal (300) comprising header information (310) and submessages (305), wherein each submessage (305) is a portion of the lengthy message, and comparing header information (310) corresponding to a submessage (305) with header information corresponding to previously stored submessages, If the header information (310) corresponding to the submessage (305) is not substantially equivalent to header information corresponding to at least one of the previously stored submessages, the submessage is stored in a memory (225). The method further comprises the step of combining the submessages (305), in response to the header information (310), to form the lengthy message.

13 Claims, 6 Drawing Sheets

METHOD AND APPARATUS FOR COMBINING SUBMESSAGES OF A MESSAGE TO FORM THE COMPLETE MESSAGE

FIELD OF THE INVENTION

This invention relates in general to selective call messaging, and more specifically to a method and apparatus for combining submessages of a message to form the complete message.

BACKGROUND OF THE INVENTION

Selective call messaging, such as paging messaging, involves transmitting a message or a page to an intended selective call receiver by radio frequency (RF) signals. The page is received from an originator at a selective call terminal and is encoded into a format recognizable by the receiver. A selective call address assigned to the receiver is added to the message to indicate the intended receiver. The message is then transmitted for reception within a selective call system coverage area in which the receiver is expected to be located.

Conventionally, information for tone, voice, numeric, and alphanumeric pages are received by the selective call terminal from remote devices via telephone audio modems or DTMF tone signalling. In addition, some pages are originated from information supplied to video display terminals (VDTs) coupled directly to the selective call terminal. The format of the signals received from the telephone and the VDTs are known to the selective call terminal and are compatible with the formatting of the selective call signals into known signalling formats.

With the advent of alphanumeric paging, the user is able to receive messages that are more detailed, thus more useful, than those received in tone, voice, or numeric pages. An alphanumeric message may, for example, contain information such as facsimiles, technical reports, data bases, etc. These types of alphanumeric messages, while informative, may be extremely lengthy. The length of the message is, however, limited by the ability of conventional selective call terminals to process pages that include very large amounts of information. This situation might arise, for example, if a number of files are sent from a computer via modem to the selective call terminal. In situations where the information sent to the selective call terminal is of excessive length and cannot be processed, the selective call terminal will only send a portion of the information to the selective call receiver. As a result, the user may receive an incomplete message or no message at all. This could create a problem if the user is unable to receive an important lengthy message in its entirety.

Thus, what is needed is a method and apparatus for combining submessages of a message to form the complete message.

SUMMARY OF THE INVENTION

According to a first aspect of the present invention, in a radio frequency communications device, a method for receiving a lengthy message comprises the steps of receiving an RF signal comprising header information and submessages, wherein each submessage is a portion of the lengthy message and comparing header information corresponding to a submessage with header information corresponding to previously stored submessages. If the header information corresponding to the submessage is not substantially equivalent to header information corresponding to at least one of the previously stored submessages, the submessage is stored in a memory. The method further comprises the step of combining the submessages, in response to the header information, to form the lengthy message.

According to a second aspect of the present invention, a radio frequency (RF) communications device for receiving lengthy messages comprises a receiver for receiving an RF signal comprising a plurality of messages, the plurality of messages comprising header information and submessages, wherein each submessage is a portion of a lengthy message. Processing circuitry coupled to the receiver combines the submessages to form the lengthy message in response to the header information, and a memory coupled to the receiver and the processing circuitry stores the submessages and the header information corresponding to each stored submessage. A comparator coupled to the memory and the receiver then compares the header information corresponding to each received submessage to the header information corresponding to previously stored submessages, and error detection circuitry coupled to the memory and the comparator determines the quality of each received submessage and the previously stored submessages. The error detection circuitry is activated by the comparator determining that the header information corresponding to a received submessage is substantially similar to the header information corresponding to a previously stored submessage.

DESCRIPTION OF A PREFERRED EMBODIMENT

Figure 1:
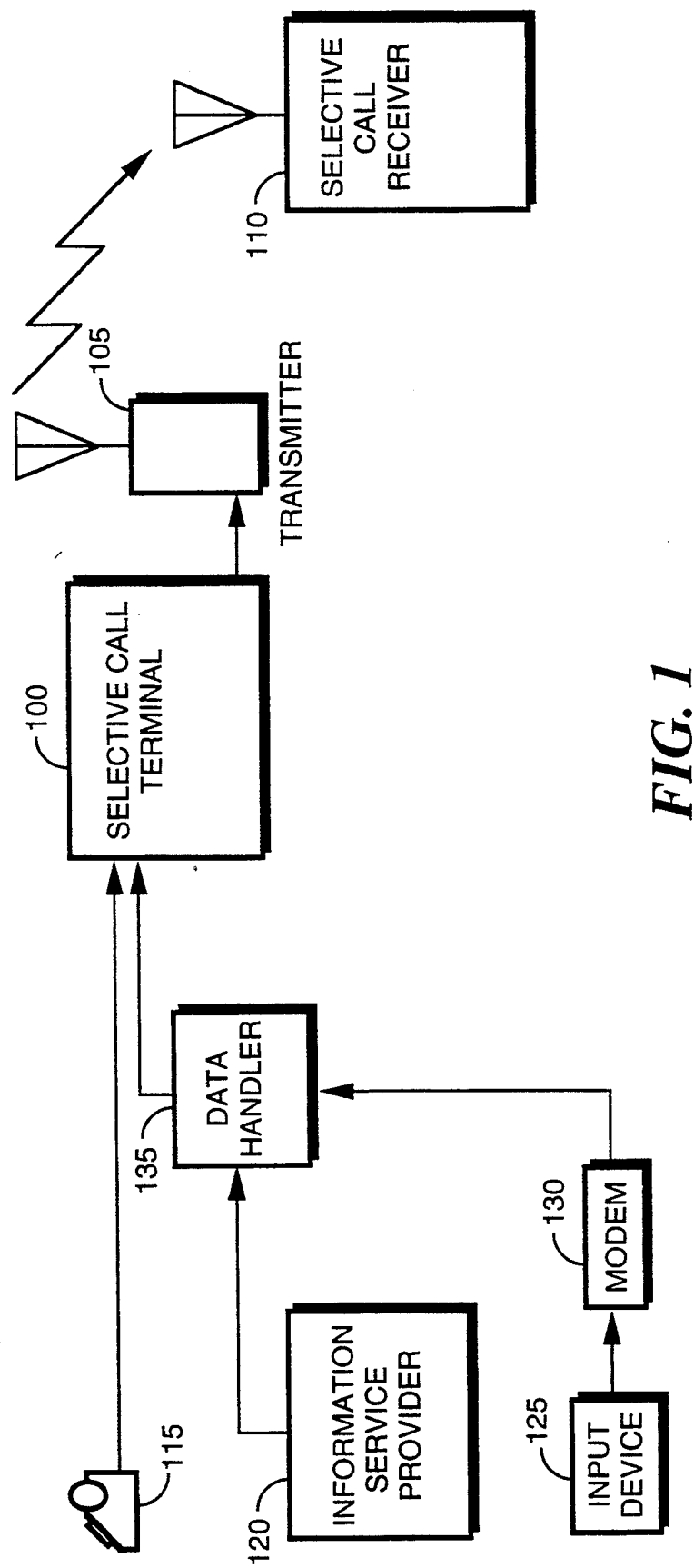
FIG. 1 is a block diagram of a selective call system in accordance with a preferred embodiment of the present invention.

Referring to FIG. 1, a selective call system, in accordance with a preferred embodiment of the present invention, comprises a selective call terminal 100 which provides selective call signals to a transmitter 105 for transmission to at least one selective call receiver 110. The selective call signals are selective call messages which have been encoded into a radio frequency (RF) signal by the selective call terminal 100.

The information comprising the selective call messages is numeric or voice information received from a telephone 115 via the public switched telephone network. Additionally, the information may be numeric or alphanumeric information received from an information service provider 120. The information service provider 120 collects information on sports, stocks, world finance, and other areas of interest to the public. Finally, the information may be received from another input device 125, e.g. a personal computer or electronic mail service, via a modem 130 as alphanumeric or numeric information.

The information from the information service provider 120 and the other input devices 125 is provided to a data handler 135 which, in accordance with the present invention, parses messages of excessive length into submessages of a size suitable for processing by the selective call terminal 100. The data handler 135 further attaches header information to each submessage sent to the selective call terminal 100. The selective call terminal 100 then encodes the information received from the data handler 135 into a known format for transmission from the transmitter 105.

The selective call receiver 110 receives the selective call signal and decodes the signal to derive the header information and submessage contained therein. Submessages are thereafter combined by the selective call receiver 110 to form a complete message in response to the header information. In this manner, the length of the complete message formed by the selective call receiver 110 is not limited by the capability of the selective call terminal 100 to process lengthy messages. The selective call receiver 110 is able to receive messages of any length for subsequent display to the user.

Figure 2:
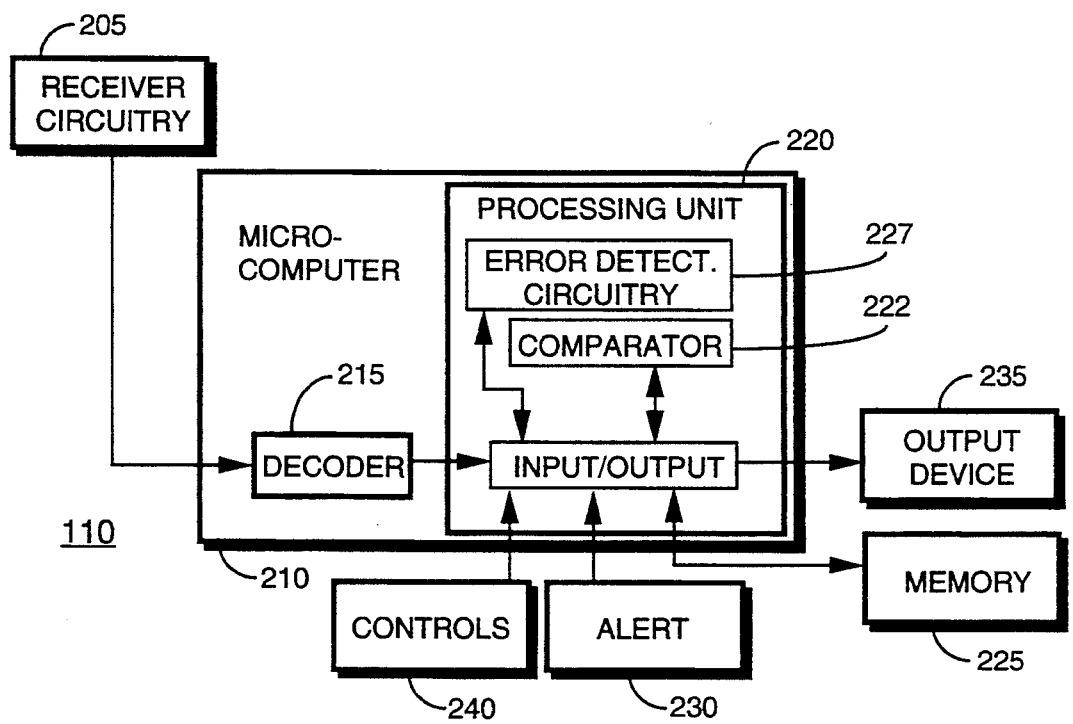
FIG. 2 is a block diagram of a selective call receiver in accordance with the preferred embodiment of the present invention.

Referring next to FIG. 2, a block diagram of the selective call receiver 110 (FIG. 1) in accordance with the preferred embodiment of the present invention is depicted. The selective call receiver 110, e.g., a pager, comprises receiver circuitry 205 for receiving and demodulating a selective call signal. A microcomputer 210 coupled to the receiver circuitry 205 comprises a decoder 215 for decoding the demodulated signal to recover an address, a submessage, and header information contained therein and a processing unit 220 for processing the decoded signal. A comparator 222, included in the processing unit 220, compares the recovered address with predetermined addresses contained in a memory 225 and, if the address is equivalent to one of the predetermined addresses, the submessage and the corresponding header information are stored in the memory 225. In accordance with the preferred embodiment of the present invention, the comparator 222 further determines whether the received submessage is a duplicate of another submessage previously stored in the memory 225. If so, error detection circuitry 227, also included in the processing unit 220, calculates which of the submessages contains the least amount of errors, in response to which the better quality submessage is stored in the memory 225 and the other submessage is discarded.

Once all of the submessages needed to form a complete message have been received by the selective call receiver 110, the processing unit 220 sends a signal to an alert mechanism 230, in response to which the alert mechanism 230 generates a sensible alert to inform the user that a message has been received. If the message is to be presented to the user, the processing unit 220 sends the message to an output device 235. The message may be presented automatically or manually, in response to the processing unit 220 receiving a signal from user actuated controls 240.

Figure 3:
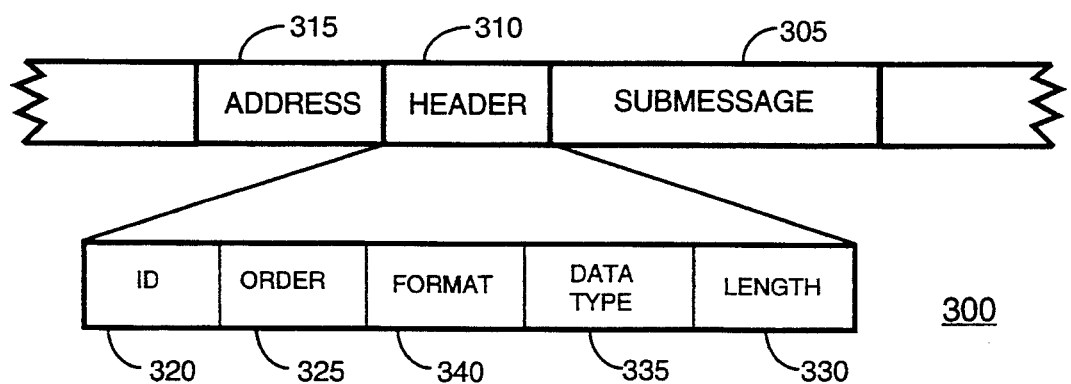
FIG. 3 is a signal diagram of a radio frequency signal in accordance with the preferred embodiment of the present invention.

Referring to FIG. 3, a signal diagram depicts a radio frequency (RF) signal 300 which, in accordance with the preferred embodiment of the present invention, contains information whereby the selective call receiver 110 (FIG. 2) may recombine submessages to form a complete message. The RF signal 300 comprises a message, which includes a submessage 305, i.e., a portion of the message, appended to header information 310. The header information 310 is preferably preceded by an address 315. When the RF signal 300 is received by the selective call receiver 110 (FIG. 2), the comparator 222 included within the microcomputer processing unit 220 compares the address 315 contained in the RF signal 300 with predetermined addresses located in the memory 225. If the address 315 corresponds to one of the predetermined addresses, the subsequent header information 310 and submessage 305 are stored in the memory 225.

The header information 310, in accordance with the preferred embodiment of the present invention, comprises message identification information 320 and message order information 325. The message identification information 320 identifies a message to which the submessage 305 corresponds. The message order information 325 includes information about placement of the submessage 305 within the complete message and also information detailing the number of submessages needed to form the complete message. When all of the submessages having the same message identification information are received, the processing unit 220 (FIG. 1) combines the separate submessages to form a complete message in response to the message order information 325. For example, the message order information 325 might specify that the submessage 305 is a second submessage out of four total submessages included in the complete message. If the other three submessages necessary to the complete message have been received previously, the processing unit 220 will form the complete message in an accurate order and send a signal to the alert mechanism 230. If any of the necessary submessages are not located in the memory 225 when the second submessage is received, the second submessage will simply be stored in the memory 225. The user will not be alerted until all of the necessary submessages are received and the complete message is formed.

The presence of the message identification information 320 and the message order information 325 allows the selective call receiver 110 (FIG. 1) to receive the submessages corresponding to a specific complete message in any order and at any time. Thus, the selective call receiver 110 is prevented from presenting incomplete or unordered messages to the user, and the user is assured of receiving complete messages, no matter the length of the message.

Optional information included in the header information 310 could comprise information specifying a message length 330 or a data type 335, e.g., numeric or alphanumeric. The header information 310 could further comprise information specifying message format 340, which, for example, might alert the user as to a type of document, e.g., text or data base, or even specify a particular software application in which the message was sent. This optional information, although not necessary for the selective call receiver 110 (FIG. 2) to form the complete message, could prove useful to the user. If, for example, the user is alerted as to the format 340 of the complete message, he may choose to download a data base received by the selective call receiver 110 (FIG. 1) onto a computer for subsequent manipulation of data, or, after noticing that a message is very lengthy, the user may decide to print the message from a printer at a later time. The user may be presented with complete messages in any number of convenient ways if such optional information is included in the header information.

Figure 4:
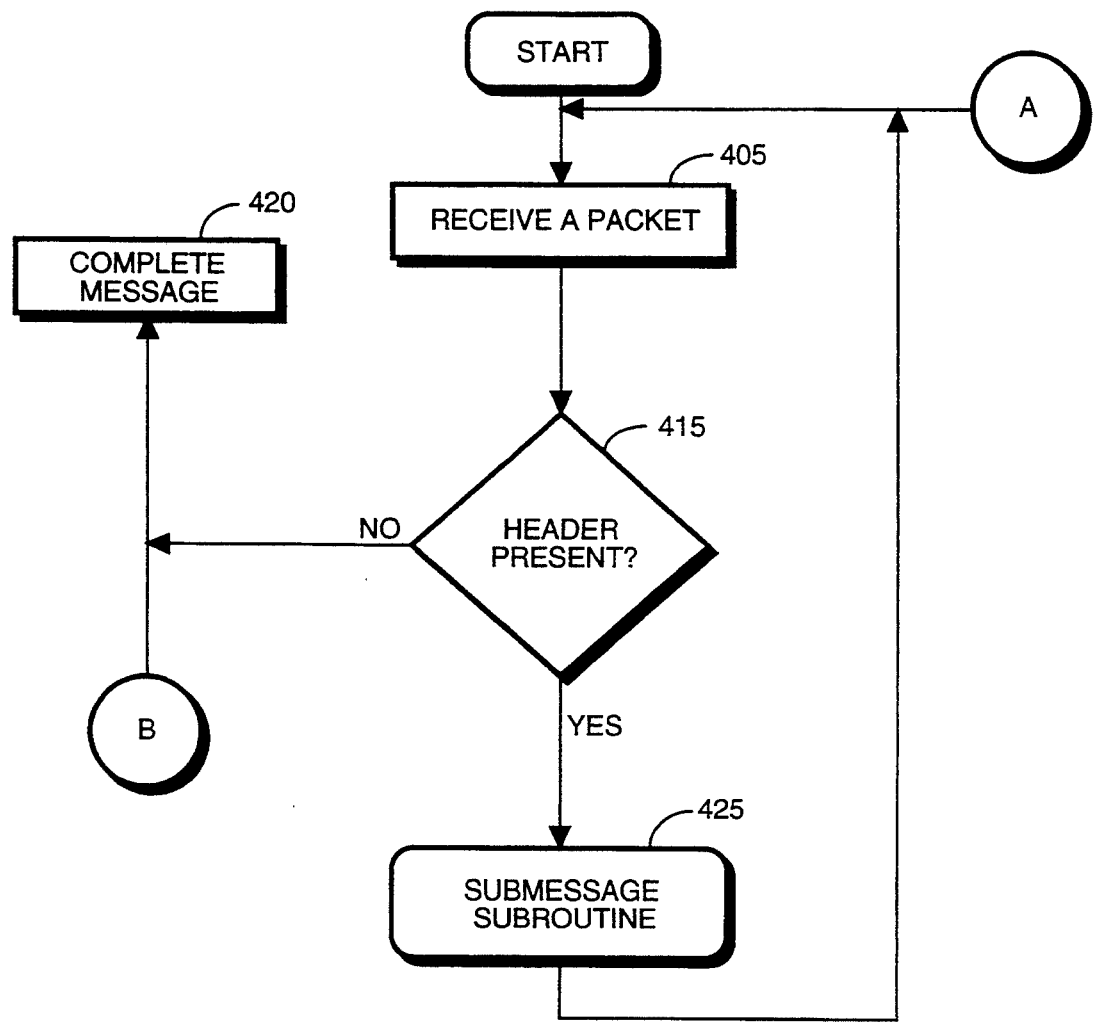
FIGS. 4-7 are flowcharts illustrating the operation of the microcomputer processing unit of FIG. 2 in accordance with the preferred embodiment of the present invention.

FIG. 4 is a flow chart illustrating the operation of the microcomputer processing unit 220 (FIG. 2) in accordance with the preferred embodiment of the present invention. When the processing unit 220 receives 405 a packet, i.e., information comprising at least an address and message information, the processing unit 220 determines 415 whether or not header information is appended to the address. The presence of the header information indicates that the packet contains a submessage that is a portion of a complete message. If no header information is present, the packet is stored as a complete message 420, and the processing unit 220 sends a signal to the alert mechanism 230 (FIG. 2) to alert the user that a message has been received. If a submessage is contained in the packet, the processing unit 220 follows a submessage subroutine 425.

Figure 5:
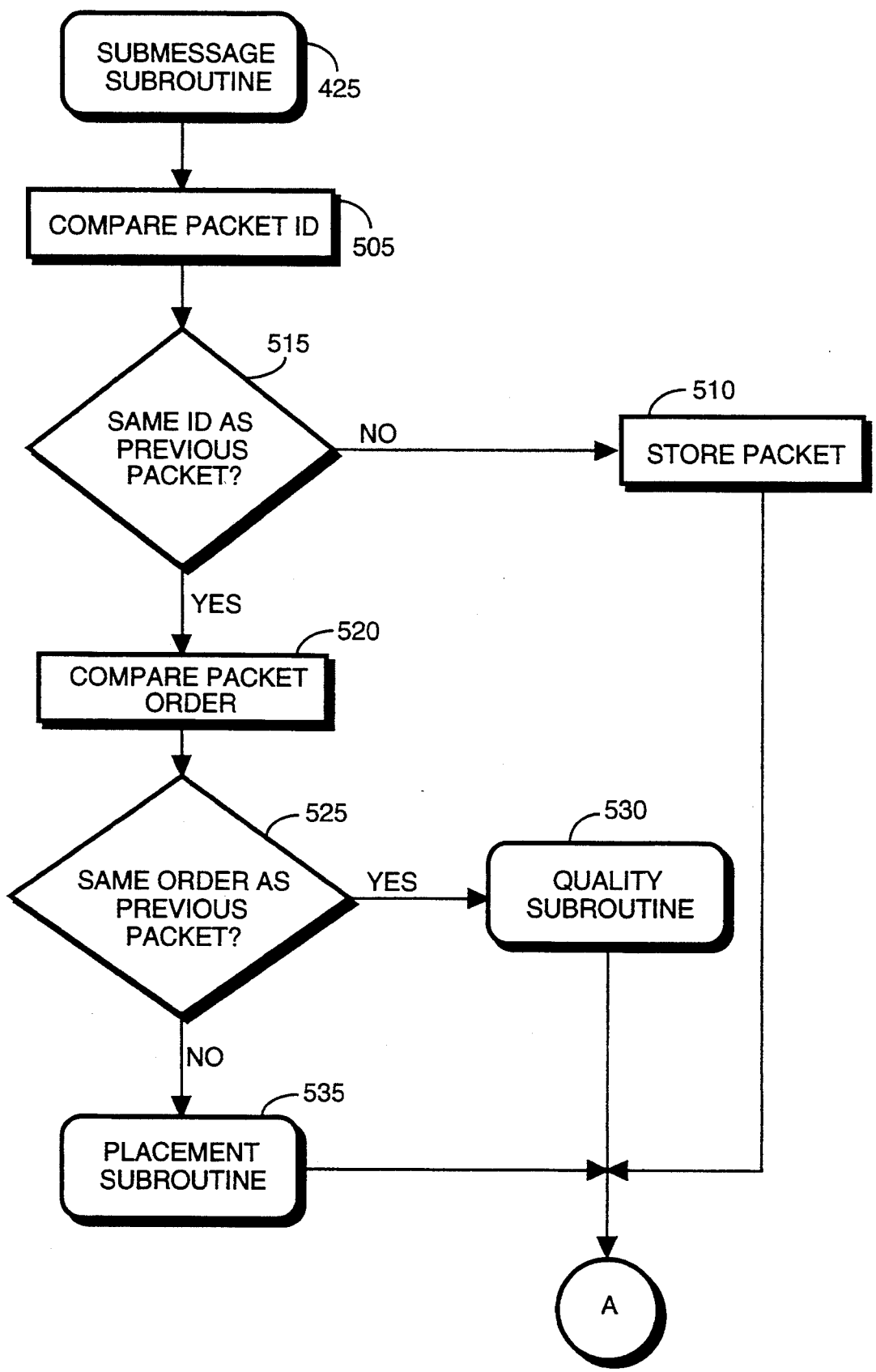

Referring next to FIG. 5, a flowchart illustrates the submessage subroutine 425 followed if header information is appended to the address, indicating the presence of a submessage. The processing unit comparator 222 (FIG. 2) compares 505 the packet message identification information with message identification information corresponding to previously stored packets. The packet is stored 510 in the memory 225 (FIG. 2) if the packet message identification information is not equivalent 515 to message identification information corresponding to at least one previously stored packet. Otherwise, the processing unit comparator 222 performs the further operation of comparing 520 packet message order information corresponding to the packet to message order information corresponding to the at least one previously stored packet. If the packet message order information is equivalent 525 to message order information corresponding to a substantially identical packet included in the at least one previously stored packet, the processing unit 220 must determine which of two similar submessages is of better quality. In this instance, the processing unit 220 follows a quality subroutine 530 to determine whether the packet or the substantially similar packet contains a better quality submessage. Alternatively, if the packet message order information is not equivalent 525 to message order information corresponding to one of the at least one previously stored packet, the submessage contained in the packet differs from submessages already contained in the memory 225. The processing unit 220 then proceeds to follow a placement subroutine 535 to determine the correct location of the packet in the memory.

Figure 6:
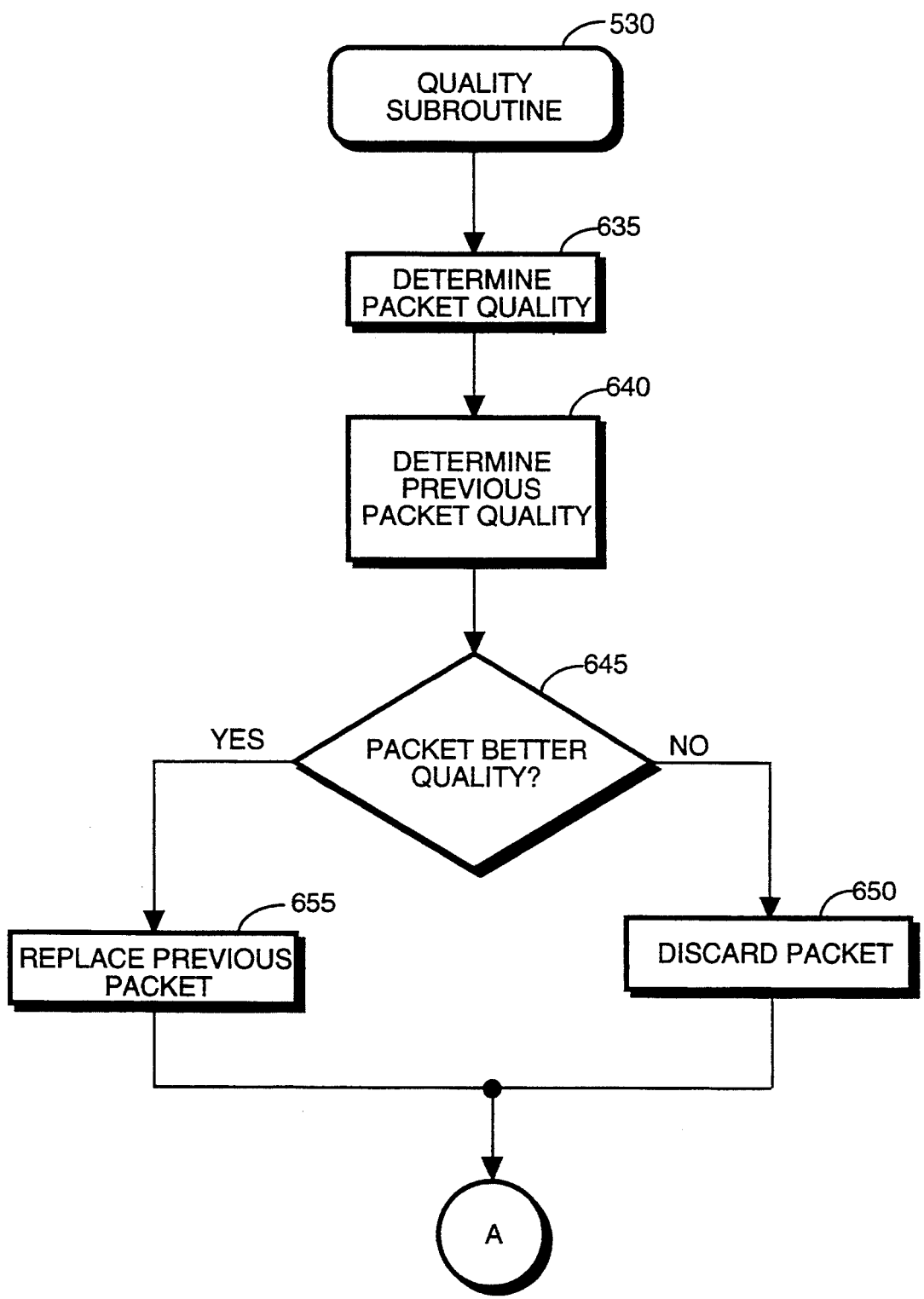

FIG. 6 illustrates the quality subroutine 530 followed by the processing unit 220 when the submessage contained in the packet is consistent with a submessage contained in a substantially identical packet. In accordance with the present invention, the processing unit error detection circuitry 227 (FIG. 2) determines 635, 640 the quality of the packet and the quality of the substantially identical packet, respectively, indicated by the percentage of errors found in each of the two packets. In order to determine which of the two packets has a least amount of errors, the quality of the packet is compared 645 to the quality of the substantially identical packet. If the substantially identical packet is of better quality than the packet, the packet is discarded 650, and the substantially identical packet remains in the memory 225 (FIG. 2). If the packet is of better quality than the substantially identical packet, however, the packet replaces 655 the substantially identical packet, which is discarded from the memory 225. During this procedure, the selective call receiver 110 (FIG. 2) receives 405 (FIG. 4) further packets in accordance with the present invention. In this manner, the user is assured of being presented with an accurate, i.e., high quality, complete message.

Figure 7:
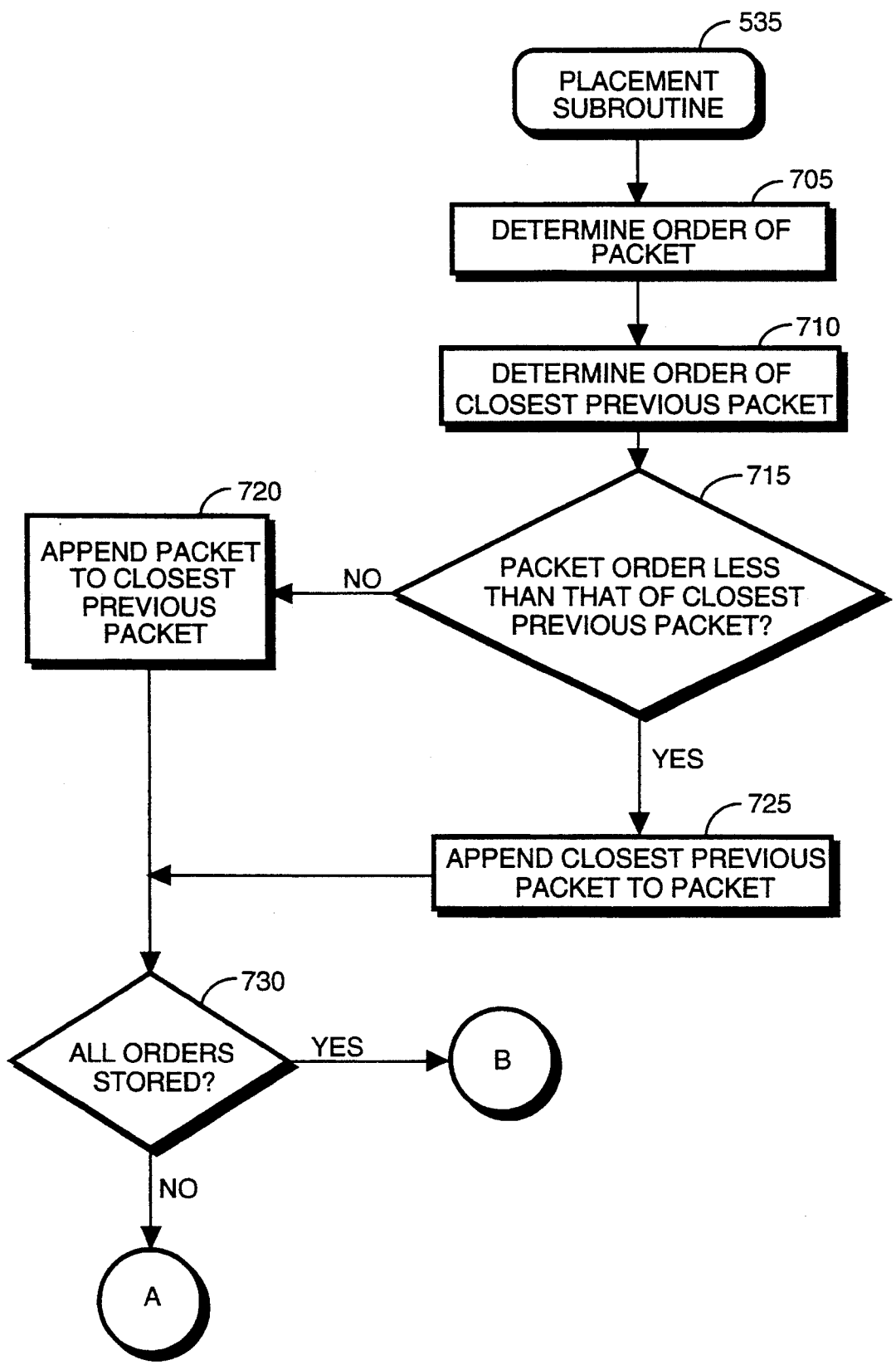

Referring next to FIG. 7, the processing unit 220, following a placement subroutine 535, orders a packet and at least one related packet in the memory 225. The processing unit 220 determines 705 a packet order of the packet and 710 a closest order of a closest packet included in the at least one related packet. The packet order and the closest order are each indicated by message order information corresponding to the packet and the closest packet, respectively. If the closest order is less than the packet order, the packet is appended 720 to the closest packet in the memory 225. Otherwise, the closest packet is appended 725 to the packet in the memory 225. The selective call receiver 110 (FIG. 2) continues to receive 405 (FIG. 4) further packets until all packets necessary to form a complete message 420 (FIG. 4) have been stored in the correct order in the memory 225. In this manner, each received packet is accurately ordered in the memory 225 in response to corresponding header information included in the received packet.

In summary, the use of submessages appended to header information in accordance with the preferred embodiment of the present invention allows the user to receive messages which would conventionally be too lengthy for processing by a selective call terminal. Because a data handler parses messages of excessive length into smaller identifiable portions, a conventional selective call terminal may be used to transmit the portions to a selective call receiver for subsequent combination into all types and lengths of messages. The selective call receiver may, for example, receive and combine into complete messages detailed data bases, news, stock information, and other messages that are useful to the user. Additionally, lengthy messages that are capable of being processed by a conventional selective call terminal may be parsed into smaller submessages, thereby avoiding tie-ups in the selective call system. In this manner, typical pages may be interspersed with pages including submessages so that the recipients of the typical pages do not wait for inordinate amounts of time to receive the pages.

Optional information, such as a message format, a data type, or a message length, may also be included in the header information. If provided with such information, the user is able to read the complete message in a manner that may be more convenient than displaying the complete message on the pager display. If, for example, the user realizes, before reading the complete message, that the complete message is several pages in length, he may choose to print the complete message on a printer at a later time. The complete message may even be downloaded onto a computer if the user is informed of the software application of the complete message. The use of the optional information in accordance with the preferred embodiment of the present invention allows the user to more conveniently tailor presentation of complete messages to fit his particular needs.

By now it should be appreciated that there has been provided a method and apparatus for combining submessages of a message to form the complete message.

What is claimed is:
1. A radio frequency (RF) communications device for receiving lengthy messages, comprising:

receiving means for receiving an RF signal comprising a plurality of messages, the plurality of messages comprising header information and submessages, wherein each submessage is a portion of a lengthy message;

storing means coupled to the receiving means for storing the submessages and the header information corresponding to each submessage;

comparing means coupled to the storing means and the receiving means for comparing the header information corresponding to each received submessage to the header information corresponding to previously stored submessages;

error detection means coupled to the storing means and the comparing means for determining the quality of each received submessage and the previously stored submessages, wherein the error detection means is activated in response to the comparing means determining that the header information corresponding to a received submessage is substantially similar to the header information corresponding to a previously stored submessage, and wherein the error detection means comprises:

means for discarding the received submessage if the previously stored submessage is of better quality than the received submessage; and means for replacing the previously stored submessage with the received submessage if the received submessage is of better quality than the previously stored submessage; and combining means coupled to the storing means and the receiving means for combining the submessages to form the lengthy message in response to the header information.

2. In a radio frequency communications device, a method for receiving a lengthy message, the method comprising the steps of:

(a) receiving an RF signal comprising header information and submessages, wherein each submessage is a portion of the lengthy message;

(b) comparing header information corresponding to a submessage with header information corresponding to previously stored submessages;

(c) if the header information corresponding to the submessage is not substantially equivalent to header information corresponding to at least one of the previously stored submessages, storing the submessage in a memory; arid (d) combining the submessages, in response to the header information, to form the lengthy message.

3. The method in accordance with claim 2, further comprising the step of:

(e) prior to step (d), replacing a previously stored submessage with the submessage if header information corresponding to the previously stored submessage is substantially similar to the header information corresponding to the submessage and the submessage is of better quality than the previously stored submessage.

4. The method in accordance with claim 3, wherein step (e) comprises the steps of:

(f) determining the quality of the submessage;

(g) determining the quality of the previously stored submessage;

(h) comparing the quality of the submessage to the quality of the previously stored submessage; and (i) if the quality of the submessage is substantially better than the quality of the previously stored submessage, replacing the previously stored submessage with the submessage.

5. The method in accordance with claim 3, further comprising the step of:

(j) prior to step (d), discarding the submessage if the header information corresponding to the submessage is substantially equivalent to the header information corresponding to the previously stored submessage and the submessage is not of better quality than the previously stored submessage.

6. The method in accordance with claim 5, wherein step (j) comprises the steps of:

(k) determining the quality of the submessage;

(l) determining the quality of the previously stored submessage;

(m) comparing the quality of the submessage to the quality of the previously stored submessage; and (n) if the quality of the submessage is not substantially better than the quality of the previously stored submessage, discarding the submessage.

7. The method in accordance with claim 2, further comprising the step of:

(o) prior to step (d), storing the submessages in the memory in an order determined by the corresponding header information.

8. The method in accordance with claim 7, wherein the header information corresponding to each submessage comprises message identification information and message order information, and wherein step (o) comprises the steps of:

(p) comparing message identification information corresponding to a received submessage to message identification information corresponding to previously stored submessages;

(q) if the message identification information corresponding to the received submessage is not substantially equivalent to the message identification information corresponding to at least one previously stored submessage, storing the received submessage in the memory;

(r) if the message identification information corresponding to the received submessage is substantially equivalent to the message identification information corresponding to at least one related submessage included in the previously stored submessages, comparing the message order information corresponding to the received submessage to message order information corresponding to the at least one related submessage;

(s) if the message order information corresponding to the received submessage is not substantially equivalent to the message order information corresponding to one of the at least one related submessage, determining the most substantially similar message order information corresponding to a closest submessage included in the at least one related submessage;

(t) if the most substantially similar message order information corresponding to the closest submessage indicates an order that is less than that indicated by message order information corresponding to the received submessage, appending the received submessage to the closest submessage in the memory; and (u) if the most substantially similar message order information corresponding the closest submessage indicates an order that is greater than that indicated by the message order information corresponding to the submessage, appending the closest submessage to the submessage in the memory.

9. A radio frequency (RF) communications device for receiving lengthy messages, comprising:

receiving means for receiving an RF signal comprising a plurality of messages, the plurality of messages comprising header information and submessages, wherein each submessage is a portion of a lengthy message;

combining means coupled to the receiving means for combining the submessages to form the lengthy message in response to the header information;

storing means coupled to the receiving means and the combining means for storing the submessages and the header information corresponding to each stored submessage;

ordering means coupled to the storing means for ordering the stored submessages in response to the header information;

comparing means coupled to the storing means and the receiving means for comparing the header information corresponding to each received submessage to the header information corresponding to previously stored submessages; and error detection means coupled to the storing means and the comparing means for determining the quality of each received submessage and the previously stored submessages.

10. The RF communications device in accordance with claim 9, wherein the error detection means is activated by the comparing means determining that the header information corresponding to a received submessage is substantially similar to the header information corresponding to a previously stored submessage.

11. The RF communications device in accordance with claim 10, wherein the error detection means comprises:

means for discarding the received submessage if the previously stored submessage is of better quality than the received submessage; and means for replacing the previously stored submessage with the received submessage if the received submessage is of better quality than the previously stored submessage.

12. A radio frequency (RF) communications device for receiving lengthy messages, comprising:

a receiver for receiving an RF signal comprising a plurality of messages, the plurality of messages comprising header information and submessages, wherein each submessage is a portion of a lengthy message;

processing circuitry coupled to the receiver for combining the submessages to form the lengthy message in response to the header information;

a memory coupled to the receiver and the processing circuitry for storing the submessages and the header information corresponding to each stored submessage;

a comparator coupled to the memory and the receiver for comparing the header information corresponding to each received submessage to the header information corresponding to previously stored submessages; and error detection circuitry coupled to the memory and the comparator for determining the quality of each received submessage and the previously stored submessages, wherein the error detection circuitry is activated by the comparator determining that the header information corresponding to a received submessage is substantially similar to the header information corresponding to a previously stored submessage.

13. The RF communications device in accordance with claim 12, wherein the error detection circuitry comprises:

means for discarding the received submessage if the previously stored submessage is of better quality than the received submessage; and means for replacing the previously stored submessage with the received submessage if the received submessage is of better quality than the previously stored submessage.

* * * * *